United States Patent

[11] 3,536,092

[72] Inventors George A. Klasson
Allentown, Pa. and
Justin W. Mills, Cinnaminson, New Jersey
[21] Appl. No. 682,246
[22] Filed Nov. 13, 1967
[45] Patented Oct. 27, 1970
[73] Assignee Air Products and Chemicals, Inc.
Philadelphia, Pennsylvania
a corporation of Delaware

[54] VALVE SEAT INSERT FOR GAS HANDLING EQUIPMENT
2 Claims, 3 Drawing Figs.
[52] U.S. Cl............................................137/329.02,
137/505.42, 251/362, 251/368
[51] Int. Cl..............................................F16k 31/145
[50] Field of Search...........................................137/329.02,
392.03, 505.42; 251/360, 361, 362, 368; 161/207,
221: 29(consulted class); 137/503.41; 251/360, 368

[56] References Cited
UNITED STATES PATENTS

| | | | |
|---|---|---|---|
| 1,947,257 | 2/1934 | Fritz | 251–361XR |
| 2,563,113 | 8/1951 | Hindin | 161/221X |
| 2,581,920 | 1/1952 | Kuhn | 161/221X |
| 2,832,563 | 4/1958 | Walsh | 251/368X |
| 2,918,081 | 12/1959 | Laver | 137/505.42X |
| 3,018,797 | 1/1962 | Parks | 251/362X |
| 3,052,445 | 9/1962 | Kessler | 251/368X |
| 3,059,898 | 10/1962 | Carlson | 251/368X |
| 3,108,779 | 10/1963 | Anderson | 251/368X |
| 3,179,546 | 4/1965 | Fischer | 161/207X |
| 3,236,496 | 2/1966 | Rosenstein | 251/368X |
| 3,267,558 | 8/1966 | Wilson | 251/368X |
| 3,379,607 | 4/1968 | Foster | 161/207 |

Primary Examiner—Harold W. Weakley
Attorneys—B. Max Klevit, William Klabunde and Ronald B. Sherer ABSTRACT: For gas handling equipment, such as low-pressure gas regulators, valves and the like used in connection with the dispensing of fuel gases, such as, acetylene, propane etc., inert gases, such as, argon, etc., and relatively inert gases, such as, carbon dioxide, nitrogen, etc., from pressured sources, such as commercial cylinders or other containers, there is provided a replaceable, and preferably reversible, flat ring type, valve seat insert for the movable valve assembly. The insert comprises a precision metal ring having an integrally-bonded overlay or coating of resilient, rubber-like material which covers the walls of the opening and extends outwardly over the flat surfaces and is composed of material maximally compatible with the particular gas being dispensed in order to provide a hard, flexible seating surface for the movable valve assembly. The metal ring is either wholly composed of or, prior to the application of the resilient material, is plated with metal which forms an excellent, molecular-bond linkage with the subsequently applied material forming the resilient coating. The bonded layers of resilient material on the opposite faces of the ring are of such minimal thickness as to constitute individually only about 5 to 15 percent of the total thickness of the finished valve seat ring. The proximity of the hard metal surface of the ring to the outer surface of the resilient coating which comes into actual contact with the movable valve member when the valve is closed, or which forms a side of the annular gap or passageway between the valve and its seat when the valve is open to permit the gas to flow at the desired pressure, serves to reinforce the inherent resiliency of the coating material.

Patented Oct. 27, 1970 3,536,092

INVENTORS
GEORGE A. KLASSON
JUSTIN W. MILLS

BY William Klamunde

ATTORNEY

3,536,092

VALVE SEAT INSERT FOR GAS HANDLING EQUIPMENT

SUMMARY OF THE INVENTION

This invention relates to gas handling equipment such as low-pressure gas regulators of the general type disclosed in Catalog No. 2767 entitled "Specialty Gases and Equipment", published in 1967, under U.S. Copyright, by Air Products and Chemicals, Inc.

The invention is particularly directed to improvements in the valve seat insert of such regulators and to its cooperative relationship with the movable valve assembly and its directly associated structure internally.

When, as in the past, valve seat inserts have been fabricated wholly from stock rubber or other known rubber-like materials, serious problems developed in connection with their use in regulators for pressure controlled dispensing of certain industrial gases. For example, in the handling of fuel gas, such as acetylene and propane and other gas such as carbon dioxide, the gas has a deleterious effect upon the resilient material, generally in the form of swelling. The dimensional change in the valve seat insert is directly related to the mass of the rubber-like material, that is, it constitutes a percentage factor of the total mass, which in an extreme case may be as great as 30 percent. This would mean that in a valve seat insert having an initial thickness of .125 inches the increase in thickness due to swelling would be .0375 inches. Such degree of swelling would eventually cause severe malfunction of the pressure regulator, necessitating too frequent replacement of the valve seat inserts.

Another problem, when the insert is formed wholly of rubber-like material, is the matter of compressive set when the valve has remained in closed position for an extended period of time. When the valve is then opened the rubber-like material gradually returns to its normal shape, thus changing the valve setting slightly. This necessitates a readjustment of the valve.

Experience has shown that the gas pressure regulators of the type referred to herein function best when the valve seat insert has a hard resiliency, such as a durometer hardness of about 90—95 percent Shore A, measured by standard ASTM procedure. The use of such fillers and plasticizers in order to achieve this desired hard resiliency, however, introduces an equally serious problem. Such additives have been found to adversely effect other properties of the rubber-like stock materials, particularly in respect to reducing their chemical resistance. Thus, even this expedient failed to achieve the desired objectives of resistance to swelling and to chemical deterioration in order to maintain the efficiency and to prolong the usable life of the valve seat insert. In extreme cases the regulator could actually become inoperative.

We have found that the aforementioned disadvantages in the use of rubber-like material for the entire valve seat insert may be overcome to a considerable degree by employment of a composite insert combining layers of both hard metal and rubber-like material in such arrangement and proportion as to achieve an effective durometer hardness of about 90—95 Shore A (ASTM) at the outer seating surface of the insert while at the same time employing a rubber-like surfacing or coating material which, of itself, has a much lower durometer hardness, such as about 70 Shore A (ASTM). By employment of the minimal practicable thickness for the layer of rubber-like material, the amount of dimensional change due to swelling can be kept within tolerable limits, and by avoiding or at least minimizing the use of fillers and plasticizers in the stock of resilient material the problem of rapid chemical deterioration may be overcome.

In accordance with the invention the improved valve seat insert comprises a flat metal ring having the general configuration of the finished product. If, as preferred, the insert is to be made reversible, so that its effective life may be substantially doubled, both inner edges of the flat surfaces of the ring are chamfered at an angle to the axis of the ring corresponding to the angle of the tapered portion of the movable valve stem with respect to its axis of movement; otherwise only one inner edge need be chamfered. The width of the chamfered surface will depend upon the desired area of contact between valve stem and valve seat.

The rubber-like material is applied to the surface of the metal ring as a thin coating which may be deposited thereon in known manner so as to form an unbroken layer covering the wall of the central opening, the chamfered seat or seats and as much of the flat face surfaces as may be practicable or convenient with known deposition techniques. Important to the invention is that there be a good overall bond between the metal ring and the applied coating of rubber-like material. As to those portions of the ring which are not coated with the rubber-like material and which may be exposed to contact with the gas being dispensed, it is equally important that there be no deleterious chemical effect resulting from such contact. To these ends it is a feature of the invention that the metal ring be composed entirely of, or at least be initially plated with, a metal which is not only impervious to adverse chemical reaction with the gas being handled but is also of such nature as to be capable of forming a strong, relatively-permanent, molecular-bond linkage with the rubber-like material providing the resilient coating.

A practical and economical combination of metals which will provide a hard base for the inert ring and a good plated surface for high corrosion resistance and good molecular-bond linkage is steel and brass, respectively, although it is to be understood that any other combination of metals which will provide all the necessary and desirable characteristics may be employed. As for the rubber-like material forming the resilient coating, any of a number of known materials may be employed to advantage, particularly neoprene.

For a fuller understanding of the invention, which comprises not only the structural design of the valve seat insert itself but also its cooperative relationship with standard elements of gas handling equipment and the modifications thereof required to adapt the same for reception of the improved valve seat insert, reference may be had to the following description and claims taken in connection with the accompanying drawings forming a part of this application, in which:

Figure 1:
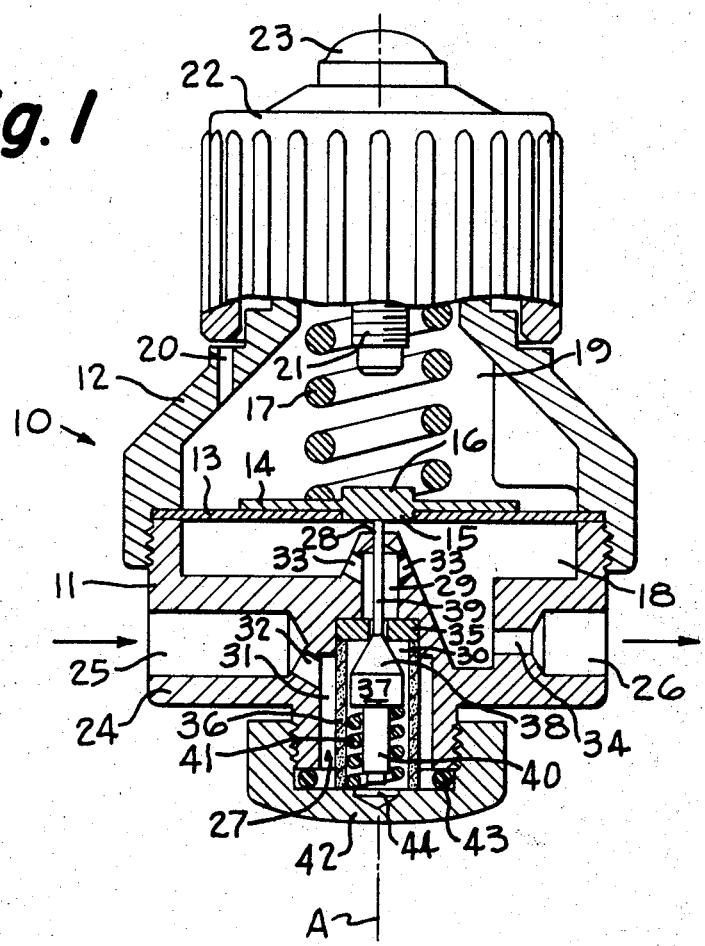
FIG. 1 is a vertical section, in elevation, of a regulator valve incorporating and adapted to receive the improved valve seat insert constituting a major feature of the invention; the upper end portion of the regulator is not shown in section, since its construction is of known type.

Referring to the drawings, the improved valve seat insert of the invention is shown in association with a typical or known type low-pressure gas regulator. It is to be understood, however that the valve seat insert is not so limited, and may be used with other pressure regulators or with other valve control devices in which the intended use, construction, and operating environment are such as to make desirable or necessary the use of valve seat inserts having the special novel features of the present invention.

Since the invention is concerned primarily with improvements in the valve portion of the regulator and its cooperating mechanism, particularly the valve seat insert, the regulator as a whole will not be described or illustrated in great detail. The regulator, which basically is of known commercial design, may be installed at its place of use in any convenient position. For ease of illustration and description, however, it will be considered as having its main axis in a vertical position with the adjusting screw assembly uppermost and the valve assembly at the bottom.

All the internal and external movable parts are either displaceable along or rotatable about the main axis and the threaded portions of the casing body and bonnet are concentric thereto.

FIG. 1 of the drawing illustrates a regulator, embodying one preferred form of the invention, in vertical partial section, a portion of the casing being broken away to reveal only as much of the inner structure as is considered necessary for a complete disclosure of the improvements constituting the invention.

The regulator comprises a split hollow casing having a lower body section 11 and an upper bonnet section 12. The casing body and bonnet are removably connected by external and internal screw-threads formed at their respective rim portions.

A horizontal circular diaphragm 13, of known flexible material suitable for the intended mechanical use and compatible with the gaseous material being handled, is rigidly clamped in fluid-tight engagement between the opposed portions of the screw-connected ends of body 11 and bonnet 12. Diaphragm 13 has a central opening, and is provided with a reinforcing plate 14 of smaller diameter. Plate 14 has circular raised portions 15 and 16 centrally located on its lower and upper faces, respectively. Lower raised portion 15 fits within the central opening of diaphragm 13, and upper raised portion 16 forms a positioning retainer for the lower end of the regulator adjusting spring 17.

Diaphragm 13 partitions the hollow casing into a lower chamber 18 and an upper chamber 19, forming, respectively, the higher pressure and lower pressure sides of the regulator. Upper chamber 19, which is provided with a vent 20 to the atmosphere, houses the adjustable mechanism for determining the delivery pressure at which the gas is to be dispensed through the regulator. The mechanism includes the adjusting spring 17, the lower end of which encircles raised portion 16 and bears against the upper surface of reinforcing plate 14 of diaphragm 13. The upper portion of spring 17 encircles the threaded lower end portion 21 of an adjusting screw forming part of an adjusting screw assembly of conventional design and operation. Threaded portion 21 of the adjusting screw carries a nonrotatable nut (not shown) at its upper end which forms a seat for the upper end of spring 17 and which, by rotation of the screw, moves up or down along the screw to regulate the pressure against diaphragm assembly.

The upper end of the adjusting screw assembly is not threaded and it extends through a bearing formed in the top of bonnet 12 on the vertical axis A. The adjusting screw assembly is ball-bearing actuated by hand operation of an adjusting knob 22 secured to an external threaded portion at the upper end of the adjusting screw by a cap nut 23.

The pressure control mechanism, comprising the valve assembly and the valve seat insert, is located in the bottom wall 24 of casing body 11. The bottom wall is relatively thick and is of irregular inner contour in order to provide wall space for drilling or otherwise forming recesses to contain a valve assembly, a valve seat insert, and a gas filter, as well as wall space for inlet and outlet ports for the gas to be dispensed. Additionally, internal wall space is provided for communicating passageways to conduct the incoming gas from the inlet port to the filter and valve assembly chamber, from the valve assembly chamber into lower casing chamber 18, and from the latter to the outlet port, as more particularly described below.

The gas inlet and outlet ports 25 and 26 are formed in the bottom wall 24 of body 11, at diametrically opposite sides of the casing. The chamber which houses the valve and filter assembly is formed in the bottom of body 11 as a stepped recess extending along the main axis A, the valve chamber being generally indicated by numeral 27.

The valve chamber, as well as the inlet and outlet ports and their internal communicating passageways, may be formed in any known convenient manner, but for the purpose of this description they will be considered as being formed by drilling and counterboring. Valve chamber 27 comprises at its innermost, that is, upper end a narrow guide hole 28 which communicates with lower casing chamber 18 at a location adjacent and below the center of reinforcing plate portion 15 extending through the opening in flexible diaphragm 13. Below guide hole 28, in order, there are formed a long, first counterbore 29, a relatively-short, second counterbore 30, and a third, final counterbore 31.

Passageway 32 provides internal communication between gas inlet port 25 and valve chamber counterbore 31; passageways 33 provide internal communication between valve chamber counterbore 29 and lower casing chamber 18; and passageway 34 provides internal communication between lower casing chamber 18 and outlet port 26.

Figure 2:
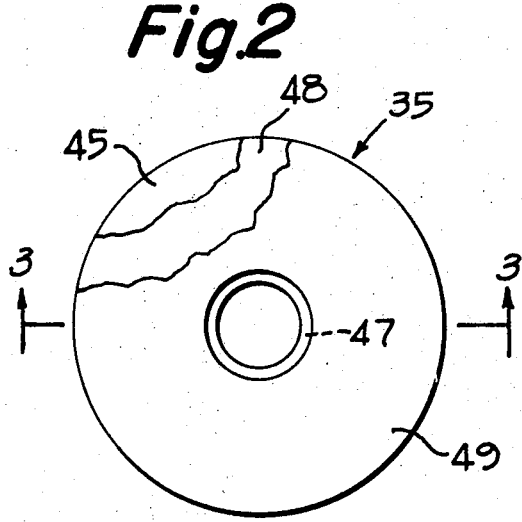
FIG. 2 is a plan view of the valve seat insert.
Figure 3:
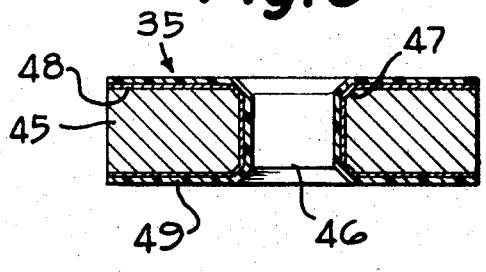
FIG. 3 is a section of the valve seat insert taken along the line 3–3 of FIG. 2.

In convenient order of assembly, the elements insertable within valve chamber 27 comprise: the improved valve seat insert 35, illustrated in FIGS. 2 and 3, which is set snugly within the base portion of counterbore 30 to seat against the shoulder formed between counterbores 29 and 30; a cylindrical, porous metal filter 36, of approximately the same diameter as counterbore 30, having its forward end portion inserted within the counterbore 30, so as to seat endwise against the outer face of valve seat insert 35, and its rear end portion extended beyond the outer end of valve chamber 27; a valve assembly consisting of: a valve 37, longitudinally movable along axis A, having a tapered forward end portion 38 engageable with the valve seat of insert 35, a valve pin 39 threaded axially into the nose of tapered valve portion 38 and extending axially forward through the valve seat opening, the counterbore 29 and the guide opening 28 to terminate substantially at the face of portion 15 of the diaphragm reinforcing plate 14, and a reduced rear end portion 40 which extends outwardly beyond the end of cylindrical filter 36; and a valve spring 41 which is set concentrically within the annular space formed between reduced valve portion 40 and the inner wall of filter 36.

Valve chamber 27 is closed at its outer end by a screw cap 42 and made fluid-tight by a seal ring 43. The outer end of valve spring 41 seats against the inside of cap 42. Spring 41 is under constant compression to urge valve 37 toward valve seat insert 35. Cap 42 has an inner central recess 44 to receive the outer end of reduced valve portion 40 in a loose sliding fit, so as to permit forced downward movement of valve 37 along axis A, against the action of spring 41, by pressure of the diaphragm against the free end of valve pin 39. FIGS. 2 and 3 show enlarged views of the valve seat insert 35. The valve seat insert comprises a metal ring 45 in the shape of a thick washer having a central opening 46 to permit free passage therethrough and axial movement therein of valve pin 39. Both peripheral edges of ring opening 46 are chamfered to provide flat circumferential seating areas 47 for the tapered portion 38 of valve 37. Double chamfering is provided in order that the valve seat insert 35 may be removed and reversed when one seating surface is worn or deformed to the point where the valve can no longer function at the desired efficiency. For reasons including low cost and hardness steel is one preferred base metal for the ring 45, although other metals may be used.

Ring 45 has a thin surface plating 48 of other metal, such as brass, which is capable of forming a molecular-bond linkage with a selected rubber-like material which is to be applied as a thin, permanently-bonded coating upon the plated surface of the ring. The thin coating 49 of rubber-like material, such as neoprene, is applied to the walls of the central opening 46, the chamfered areas 47, and all or at least a substantial major portion of the faces of the plated ring 45. The extent to which the rubber-like coating is applied across the faces of the ring may depend upon various factors, such as, problems involved in handling the ring while the coating is being applied or upon the degree of corrosion protection that is desired for the surfaces of the insert exposed to any deleterious action resulting from their contact with the particular gas being dispensed.

While the invention has particularly advantageous application to low pressure gas regulation, it is conceivable that the improved valve seat insert may in certain instances be applicable to high pressure operation. Furthermore, the insert may have application to valve devices other than pressure regulators as specifically described herein.

It is contemplated that the metal ring 45 may be formed entirely of material which provides the desired molecular-bond linkage with the coating and the necessary hardness to firmly back up the coating, material in which case the plating step is eliminated. Likewise, latitude is contemplated in the selection of the rubber-like coating material. While neoprene has been mentioned as being desirable, it is possible that other rubber-like materials compatible with the gas being handled and capable of forming the proper molecular-bond linkage with the metallic ring, may be employed to advantage within the spirit of the invention.

In a typical low-pressure operation of the illustrated embodiment, pressure gas from a commercial container, not shown, may be introduced at a line pressure of several hundred lbs./sq. in. gauge into the regulator through inlet port 25. The gas flows through passageway 32 into the annular region of counterbore surrounding cylindrical filter 36. Passing through the filter impurities are removed from the gas stream and the gas then flows through the opening 46 in the valve seat insert under the control of valve 37. The gas flows through counterbore 29 and through passageways 33 into chamber 18, and then out of chamber 18 through passageway 34 and outlet port 26. From outlet port 26 the gas is conducted to the point of use by a conduit system, not shown. The usual pressure and flow gauges associated with the regulator are, for simplicity of illustration, not shown.

By adjustment of the knob 22 to urge the diaphragm downwardly against valve pin 39, thereby opening valve 37, the desired gas pressure may be established within chamber 18. For example the regulator may be set for constant delivery at 15 lbs./sq. in. gauge. In this situation the gas pressure under the diaphragm balances the downward pressure exerted by spring 17 on the top of the diaphragm. Whenever a pressure embalance occurs, such that the desired gas delivery pressure tends to vary, the diaphragm will move up or down, as the case may be, to narrow or to widen the valve opening, that is, the gap between the valve and its seat, in which case the flow of gas through the valve is diminished or increased until the pressure variance is corrected.

By means of the improvements constituting the present invention, the effective life of the valve mechanism is considerably prolonged and the valve is less subject to severe malfunction as a result of excessive dimensional changes occuring in the valve seat by reason of its contact with certain gases which have a deleterious effect upon the resilient material forming the actual seating surface for the movable valve. The invention not only appreciably limits the degree of change which may occur in the valve opening but also limits the rate and amount of deterioration which may occur in the resilient valve seat, without appreciable sacrifice in the hardness requirements of the valve seat itself. It is contemplated, for example, that in the handling of certain gases which would have no deleterious effect upon the metal surface of the insert ring it may suffice to provide the resilient coating substantially only in the actual area of contact with the valve. In such case, the rubber-like coating may be applied to extend only slightly beyond the edges of the chamfered area or areas of the insert ring.

We claim:

1. In apparatus for maintaining constant low pressure of a gas from a relatively high pressure source, including a casing having an internal flexible diaphragm dividing said casing into two chambers, one chamber being vented to the atmosphere and containing adjustable resilient means for exerting a predetermined constant pressure against the diaphragm, and the other chamber being a gas chamber provided with valve-controlled inlet means connectable with said gas source and with an outlet connectable to a gas delivery line, said valve-controlled inlet means comprising:

a. a removable valve seat insert ring whose central opening provides the inlet to the gas chamber for gas from said high pressure source;

b. a spring-loaded valve assembly co-axial with said insert ring and including a conical valve member movable along the common axis and being constantly urged by its valve spring toward seating engagement about the inner perimeter of said insert ring opening; and c. means associated with the forward end of said conical valve member and with the central portion of said diaphragm to effect movement of said valve member in accordance with the movement of said diaphragm resulting from an imbalance between the force exerted upon said diaphragm by said resilient means within the vented chamber and the force exerted oppositely thereon by the gas pressure within said gas chamber; said valve seat insert (a) comprising:

1. a metallic ring having flat parallel faces and at least one inner perimeter chamfered to provide a seating area for said conical valve member; and 2. a continuous thin coating of resilient rubber-like material, constituting about 5—15 percent of the overall insert ring thickness, covering the walls of the central opening, the valve seat area and at least a substantial major portion of the faces of said insert ring extending radially outward from said opening, said rubber-like coating material and at least the metallic surfaces of said insert ring contacting the same being such as to form therewith an intimate bond and said coating being of a material having a Shore A (ASTM) durometer hardness of about 20 to 25 scale numbers below that required for an insert ring composed substantially entirely of ribber-like material.

2. A device according to claim 1, wherein the coating material is "neoprene", the valve seat body is steel and interposed therebetween is a layer of brass.